(12) United States Patent
Chapuis et al.

(10) Patent No.: US 12,503,668 B2
(45) Date of Patent: *Dec. 23, 2025

(54) ODORANT COMPOUND

(71) Applicant: Firmenich SA, Satigny (CH)

(72) Inventors: Christian Chapuis, Satigny (CH);
Julien Coulomb, Satigny (CH);
Fabrice Robvieux, Satigny (CH)

(73) Assignee: FIRMENICH SA, Satigny (CH)

( * ) Notice: Subject to any disclaimer, the term of this patent is extended or adjusted under 35 U.S.C. 154(b) by 566 days.

This patent is subject to a terminal disclaimer.

(21) Appl. No.: 17/996,214

(22) PCT Filed: Apr. 12, 2021

(86) PCT No.: PCT/EP2021/059454
§ 371 (c)(1),
(2) Date: Oct. 13, 2022

(87) PCT Pub. No.: WO2021/209393
PCT Pub. Date: Oct. 21, 2021

(65) Prior Publication Data
US 2023/0227751 A1 Jul. 20, 2023

(30) Foreign Application Priority Data
Apr. 14, 2020 (EP) .................................. 20169386

(51) Int. Cl.
*C11B 9/00* (2006.01)
*C07C 49/647* (2006.01)

(52) U.S. Cl.
CPC ............ *C11B 9/003* (2013.01); *C07C 49/647* (2013.01); *C07C 2601/08* (2017.05)

(58) Field of Classification Search
CPC .... C11B 9/003; C07C 2601/08; C07C 49/647
See application file for complete search history.

(56) References Cited

U.S. PATENT DOCUMENTS

| 3,686,097 A | 8/1972 | Kropp |
| 4,045,489 A * | 8/1977 | Wiegers ................ C07C 49/647 568/348 |
| 4,217,251 A | 8/1980 | Dastur |
| 4,904,640 A * | 2/1990 | Markert .................. C07C 45/74 568/379 |
| 5,283,237 A | 2/1994 | Boden et al. |
| 11,859,151 B2 * | 1/2024 | Coulomb .................. A61Q 9/02 |
| 2018/0064108 A1 * | 3/2018 | Bedoukian ............. A01N 31/06 |

FOREIGN PATENT DOCUMENTS

| JP | 2004085279 A  *  3/2004 |
| WO | 2008/142591 A2    11/2008 |

OTHER PUBLICATIONS

Wright J., "Flavor Bites: (E)-2-(3,7-Dimethyl 2,6-octadienyl) cyclopentanone", Perfumer & Flavorist, vol. 41, No. 6, pp. 20 and 22 (2016).

* cited by examiner

*Primary Examiner* — Latosha Hines
(74) *Attorney, Agent, or Firm* — Armstrong Teasdale LLP

(57) ABSTRACT

The present invention relates to the field of perfumery. More particularly, it concerns a compound of formula (I) as defined herein below, and its uses as perfuming ingredients. Therefore, following what is mentioned herein, the present invention comprises the invention compound as part of a perfuming composition or of a perfumed consumer product. Moreover, the present invention relates to a properfume compound suitable to release the compound of formula (I).

15 Claims, No Drawings

ODORANT COMPOUND

This present application is a U.S. national phase entry under 35 U.S.C. § 371 of PCT Application No. PCT/EP2021/059454, filed Apr. 12, 2021, which claims priority to European Patent Application No. 20169386.8, filed Apr. 14, 2020. The entire contents of these applications are explicitly incorporated herein by this reference.

TECHNICAL FIELD

The present invention relates to the field of perfumery. More particularly, it concerns a compound of formula (I) as defined herein below, and its uses as perfuming ingredients. Therefore, following what is mentioned herein, the present invention comprises the invention compound as part of a perfuming composition or of a perfumed consumer product. Moreover, the present invention relates to a properfume compound suitable to release the compound of formula (I).

BACKGROUND OF THE INVENTION

In the perfumery industry, there is a constant need to provide compounds imparting novel organoleptic notes.

The present invention provides a novel perfumery ingredient of formula (I), which has never been reported, imparting lactonic and green notes.

To the best of our knowledge, the prior art reports some structural analogues as perfuming ingredients.

DE 2721002 reports 2,2,5-trimethyl-5-pentylcyclopentan-1-one also called Veloutone® (trademark from Firmenich SA, Suisse) which is described as possessing fruity odor. Compounds reported in said document are different from the one of the present invention in term of chemical structure but also in term of organoleptic properties imparted.

Therefore, none of these prior art documents reports or suggests any organoleptic properties of the compounds of formula (I), or any use of said compounds in the field of perfumery.

DESCRIPTION OF THE INVENTION

Surprisingly, it has now been discovered that a compound of formula (I) possesses lactonic and green note particularly appreciated in perfumery.

A first object of the present invention is a compound of formula

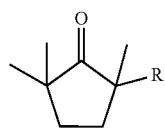
(I)

in the form of any one of its stereoisomers or as a mixture thereof, wherein R represents a $C_{2-8}$ alkenyl or $C_{4-8}$ alkadienyl group.

Said compound can be used as perfuming ingredient, for instance to impart odor notes of the lactonic type with green connotation.

According to any one of the above embodiments of the invention, said compounds (I) are $C_{10}$-$C_{16}$ compounds, particularly, $C_1$-$C_{14}$ compounds, even more particularly, $C_{12}$-$C_{13}$ compounds.

For the sake of clarity, by the expression "any one of its stereoisomers or a mixture thereof", or the similar, it is meant the normal meaning understood by a person skilled in the art, i.e. that the compound of formula (I) can be a pure enantiomer (if optically active) or diastereomer (e.g. the double bond is in a configuration E or Z). In other words, the compound of formula (I) may possess one or several stereocenters and each of said stereocenter can have two different stereochemistries (e.g. R or S). The compound of formula (I) may even be in the form of a pure enantiomer or in the form of a mixture of enantiomers or diastereoisomers. The compound of formula (I) can be in a racemic form or scalemic form. Therefore, the compound of formula (I) can be one stereoisomers or in the form of a composition of matter comprising, or consisting of, various stereoisomers.

According to any one of the above embodiments of the invention, said compound can be in the form of its E or Z isomer or of a mixture thereof, e.g. the invention comprises compositions of matter consisting of one or more compounds of formula (I), having the same chemical structure but differing by the configuration of the double bond. In a particular embodiment, compound (I) can be in the form of a mixture consisting of isomers E and Z and wherein said isomer E represent at least 50% of the total mixture, or even at least 75% (i.e. a mixture E/Z comprised between 75/25 and 100/0). In another particular embodiment, compound (I) can be in the form of a mixture consisting of isomers E and Z and wherein said isomer Z represent at least 50% of the total mixture, or even at least 75% (i.e. a mixture E/Z comprised between 25/75 and 0/100).

The terms "alkenyl" or "alkadienyl" are understood as comprising branched and linear alkenyl and alkadienyl groups and they are understood as comprising respectively 1 or 2 olefinic double bonds.

According to any one of the above embodiments of the invention, R may be a $C_{2-8}$ alkenyl group. Particularly, R may be a $C_{2-6}$ alkenyl group. Even more particularly, R may be a linear $C_{2-6}$ alkenyl group.

According to any embodiments of the invention, the compound is of formula

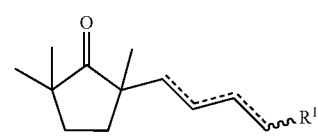
(II)

in the form of any one of its stereoisomers or as a mixture thereof, wherein one dotted line represents a carbon-carbon double bond and the other dotted lines represent a carbon-carbon single bond; $R^1$ represents a hydrogen atom or a $C_{1-2}$ alkyl group.

For the sake of clarity, by the expression "wherein one dotted line represents a carbon-carbon single bond and the other dotted lines a carbon-carbon single bond", or the similar, it is meant the normal meaning understood by a person skilled in the art, i.e. that the whole bonding (solid and dotted line) between the carbon atoms connected by said dotted line is a carbon-carbon single or double bond.

According to any embodiments of the invention, $R^1$ represents a hydrogen atom or a methyl group.

As specific examples of the invention's compounds, one may cite, as non-limiting example, 2-(but-3-en-1-yl)-2,5,5-trimethylcyclopentan-1-one which imparts lactonic, sage and lavender notes.

As other example, one may cite 2,2,5-trimethyl-5-[(1E)-1-penten-1-yl]cyclopentanone, which possesses an odor similar to the one mentioned above.

As other specific, but non-limiting, examples of the invention's compounds, one may cite the following ones in Table 1:

TABLE 1

Invention's compounds and their odor properties

| Compound structure and name | Odor notes |
|---|---|
| <br>2-[(l-buten-1-yl]-2,5,5-trimethylcyclopentanone | latonic, lavender, green |
| 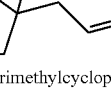<br>2-[1-hexen-1-yl]-2,5,5-trimethylcyclopentanone | Lactonic, green |
| <br>allyl-2,5,5-trimethylcyclopentanone | Lactonic, green |
| 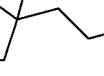<br>2-(5-hexen-1-yl)-2,5,5-trimethylcyclopentanone | Lactonic, green |
| 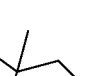<br>2-[3-hexen-1-yl]-2,5,5-trimethylcyclopentanone | Lactonic, green |
| 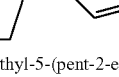<br>2-[4-hexen-1-yl]-2,5,5-trimethylcyclopentanone | Lactonic, green |
| <br>2,2,5-trimethyl-5-(pent-2-enyl)cyclopentanone | Lactonic, green |

TABLE 1-continued

Invention's compounds and their odor properties

| Compound structure and name | Odor notes |
|---|---|
| 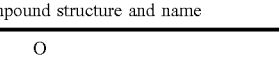<br>(E)-2-(hex-2-enyl)-2,5,5-trimethylcyclopentanone | Lactonic, green |

According to a particular embodiment of the invention, the compounds of formula (I) are 2-(but-3-en-1-yl)-2,5,5-trimethylcyclopentan-1-one, 2,2,5-trimethyl-5-[(1E)-1-penten-1-yl]cyclopentanone, 2-[(1-buten-1-yl]-2,5,5-trimethylcyclopentanone, 2-[1-hexen-1-yl]-2,5,5-trimethylcyclopentanone, 2-allyl-2,5,5-trimethylcyclopentanone, 2-(5-hexen-1-yl)-2,5,5-trimethylcyclopentanone, 2-[3-hexen-1-yl]-2,5,5-trimethylcyclopentanone, 2-[4-hexen-1-yl]-2,5,5-trimethylcyclopentanone, 2-(hex-2-enyl)-2,5,5-trimethylcyclopentanone, 2,2,5-trimethyl-5-(pent-2-enyl) cyclopentanone. Particularly, the compounds of formula (I) are 2-(but-3-en-1-yl)-2,5,5-trimethylcyclopentan-1-one, 2,2,5-trimethyl-5-[(1E)-1-penten-1-yl]cyclopentanone, 2,2,5-trimethyl-5-(pent-2-enyl)cyclopentanone. Even more particularly, the compounds of formula (I) are 2-(but-3-en-1-yl)-2,5,5-trimethylcyclopentan-1-one.

When the odor of the invention's compounds is compared with that of the prior art compound Veloutone®, then the invention's compounds distinguish themselves by a clearly stronger aromatic, sage and lavender notes and by lacking the fruity note so characteristic of the prior art compound. The odor of the invention's compounds is also cleaner and fresher than the odor of the prior art compound. Said differences lend the invention's compounds and the prior art compound to be each suitable for different uses, i.e. to impart different organoleptic impressions.

As mentioned above, the invention concerns the use of a compound of formula (I) as a perfuming ingredient. In other words, it concerns a method or a process to confer, enhance, improve or modify the odor properties of a perfuming composition or of a perfumed article or of a surface, which method comprises adding to said composition or article an effective amount of at least a compound of formula (I), e.g. to impart its typical note. Understood that the final hedonic effect may depend on the precise dosage and on the organoleptic properties of the invention's compound, but anyway the addition of the invention's compound will impart to the final product its typical touch in the form of a note, touch or aspect depending on the dosage.

By "use of a compound of formula (I)" it has to be understood here also the use of any composition containing a compound (I) and which can be advantageously employed in the perfumery industry.

Said compositions, which in fact can be advantageously employed as perfuming ingredients, are also an object of the present invention.

Therefore, another object of the present invention is a perfuming composition comprising:
  i) as a perfuming ingredient, at least one invention's compound as defined above; ii) at least one ingredient selected from the group consisting of a perfumery carrier and a perfumery base; and
  iii) optionally at least one perfumery adjuvant.

By "perfumery carrier" it is meant here a material which is practically neutral from a perfumery point of view, i.e. that does not significantly alter the organoleptic properties of perfuming ingredients. Said carrier may be a liquid or a solid.

As liquid carrier one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting examples, solvents such as butylene or propylene glycol, glycerol, dipropyleneglycol and its monoether, 1,2,3-propanetriyl triacetate, dimethyl glutarate, dimethyl adipate 1,3-diacetyloxypropan-2-yl acetate, diethyl phthalate, isopropyl myristate, benzyl benzoate, benzyl alcohol, 2-(2-ethoxyethoxy)-1-ethano, tri-ethyl citrate or mixtures thereof, which are the most commonly used. For the compositions which comprise both a perfumery carrier and a perfumery base, other suitable perfumery carriers than those previously specified, can be also ethanol, water/ethanol mixtures, limonene or other terpenes, isoparaffins such as those known under the trademark Isopar® (origin: Exxon Chemical) or glycol ethers and glycol ether esters such as those known under the trademark Dowanol® (origin: Dow Chemical Company), or hydrogenated castors oils such as those known under the trademark Cremophor® RH 40 (origin: BASF).

Solid carrier is meant to designate a material to which the perfuming composition or some element of the perfuming composition can be chemically or physically bound. In general, such solid carriers are employed either to stabilize the composition, or to control the rate of evaporation of the compositions or of some ingredients. Solid carriers are of current use in the art and a person skilled in the art knows how to reach the desired effect. However by way of non-limiting examples of solid carriers, one may cite absorbing gums or polymers or inorganic materials, such as porous polymers, cyclodextrins, wood based materials, organic or inorganic gels, clays, gypsum talc or zeolites.

As other non-limiting examples of solid carriers, one may cite encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloide: Stabilisatoren, Dickungs-und Geliermittel in Lebensmitteln, Band 2 der Schriftenreihe Lebensmittelchemie, Lebensmittelqualität, Behr's Verlag GmbH & Co., Hamburg, 1996. The encapsulation is a well-known process to a person skilled in the art, and may be performed, for instance, by using techniques such as spray-drying, agglomeration or yet extrusion; or consists of a coating encapsulation, including coacervation and complex coacervation techniques.

As non-limiting examples of solid carriers, one may cite in particular the core-shell capsules with resins of aminoplast, polyamide, polyester, polyurea or polyurethane type or a mixture thereof (all of said resins are well known to a person skilled in the art) using techniques like phase separation process induced by polymerization, interfacial polymerization, coacervation or altogether (all of said techniques have been described in the prior art), optionally in the presence of a polymeric stabilizer or of a cationic copolymer.

Resins may be produced by the polycondensation of an aldehyde (e.g. formaldehyde, 2,2-dimethoxyethanal, glyoxal, glyoxylic acid or glycolaldehyde and mixtures thereof) with an amine such as urea, benzoguanamine, glycoluryl, melamine, methylol melamine, methylated methylol melamine, guanazole and the like, as well as mixtures thereof. Alternatively, one may use preformed resins alkylolated polyamines such as those commercially available under the trademark Urac® (origin: Cytec Technology Corp.), Cymel© (origin: Cytec Technology Corp.), Urecoll® or Luracoll® (origin: BASF).

Other resins are the ones produced by the polycondensation of an a polyol, like glycerol, and a polyisocyanate, like a trimer of hexamethylene diisocyanate, a trimer of isophorone diisocyanate or xylylene diisocyanate or a Biuret of hexamethylene diisocyanate or a trimer of xylylene diisocyanate with trimethylolpropane (known with the tradename of Takenate®, origin: Mitsui Chemicals), among which a trimer of xylylene diisocyanate with trimethylolpropane and a Biuret of hexamethylene diisocyanate are preferred.

Some of the seminal literature related to the encapsulation of perfumes by polycondensation of amino resins, namely melamine-based resins with aldehydes includes articles such as those published by K. Dietrich et al. *Acta Polymerica*, 1989, vol. 40, pages 243, 325 and 683, as well as 1990, vol. 41, page 91. Such articles already describe the various parameters affecting the preparation of such core-shell microcapsules following prior art methods that are also further detailed and exemplified in the patent literature. U.S. Pat. No. 4,396,670, to the Wiggins Teape Group Limited is a pertinent early example of the latter. Since then, many other authors have enriched the literature in this field and it would be impossible to cover all published developments here, but the general knowledge in encapsulation technology is very significant. More recent publications of pertinence, which disclose suitable uses of such microcapsules, are represented for example by the article of K. Bruyninckx and M. Dusselier, ACS Sustainable Chemistry & Engineering, 2019, vol. 7, pages 8041-8054.

By "perfumery base" what is meant here is a composition comprising at least one perfuming co-ingredient.

Said perfuming co-ingredient is not of formula (I). Moreover, by "perfuming co-ingredient" it is meant here a compound, which is used in a perfuming preparation or a composition to impart a hedonic effect. In other words such a co-ingredient, to be considered as being a perfuming one, must be recognized by a person skilled in the art as being able to impart or modify in a positive or pleasant way the odor of a composition, and not just as having an odor.

The nature and type of the perfuming co-ingredients present in the base do not warrant a more detailed description here, which in any case would not be exhaustive, the skilled person being able to select them on the basis of his general knowledge and according to the intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or sulphurous heterocyclic compounds and essential oils, and said perfuming co-ingredients can be of natural or synthetic origin.

In particular one may cite perfuming co-ingredients knows for having a similar olfactive note, such as:

In particular one may cite perfuming co-ingredients which are commonly used in perfume formulations, such as:

Aldehydic ingredients: decanal, dodecanal, 2-methyl-undecanal, 10-undecenal, octanal, nonanal and/or nonenal;

Aromatic-herbal ingredients: eucalyptus oil, camphor, eucalyptol, 5-methyltricyclo[6.2.1.0 ~2,7~]undecan-4- one, 1-methoxy-3-hexanethiol, 2-ethyl-4,4-dimethyl-1,3-oxathiane, 2,2,7/8,9/10-Tetramethylspiro[5.5]undec-8-en-1-one, menthol and/or alpha-pinene;

Balsamic ingredients: coumarin, ethylvanillin and/or vanillin;

Citrus ingredients: dihydromyrcenol, citral, orange oil, linalyl acetate, citronellyl nitrile, orange terpenes, limonene, 1-p-menthen-8-yl acetate and/or 1,4(8)-p-menthadiene;

Floral ingredients: methyl dihydrojasmonate, linalool, citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4(2H)-pyranol, beta ionone, methyl 2-(methylamino) benzoate, (E)-3-methyl-4-(2,6,6-trimethyl-2-cyclohexen-1-yl)-3-buten-2-one, (1E)-1-(2,6,6-trimethyl-2-cyclohexen-1-yl)-1-penten-3-one, 1-(2,6,6-trimethyl-1,3-cyclohexadien-1-yl)-2-buten-1-one, (2E)-1-(2,6,6-trimethyl-2-cyclohexen-1-yl)-2-buten-1-one, (2E)-1-[2,6,6-trimethyl-3-cyclohexen-1-yl]-2-buten-1-one, (2E)-1-(2,6,6-trimethyl-1-cyclohexen-1-yl)-2-buten-1-one, 2,5-dimethyl-2-indanmethanol, 2,6,6-trimethyl-3-cyclohexene-1-carboxylate, 3-(4,4-dimethyl-1-cyclohexen-1-yl)propanal, hexyl salicylate, 3,7-dimethyl-1,6-nonadien-3-ol, 3-(4-isopropylphenyl)-2-methylpropanal, verdyl acetate, geraniol, p-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate, high cis methyl dihydrojasmonate, 3-methyl-5-phenyl-1-pentanol, verdyl proprionate, geranyl acetate, tetrahydro linalool, cis-7-p-menthanol, propyl (S)-2-(1,1-dimethylpropoxy)propanoate, 2-methoxynaphthalene, 2,2,2-trichloro-1-phenylethyl acetate, 4/3-(4-hydroxy-4-methylpentyl)-3-cyclohexene-1-carbaldehyde, amylcinnamic aldehyde, 8-decen-5-olide, 4-phenyl-2-butanone, isononyle acetate, 4-(1,1-dimethylethyl)-1-cyclohexyl acetate, verdyl isobutyrate and/or mixture of methylionones isomers;

Fruity ingredients: gamma-undecalactone, 2,2,5-trimethyl-5-pentylcyclopentanone, 2-methyl-4-propyl-1,3-oxathiane, 4-decanolide, ethyl 2-methyl-pentanoate, hexyl acetate, ethyl 2-methylbutanoate, gamma-nonalactone, allyl heptanoate, 2-phenoxyethyl isobutyrate, ethyl 2-methyl-1,3-dioxolane-2-acetate, 3-(3,3/1,1-dimethyl-5-indanyl)propanal, diethyl 1,4-cyclohexanedicarboxylate, 3-methyl-2-hexen-1-yl acetate, 1-[3,3-dimethylcyclohexyl]ethyl [3-ethyl-2-oxiranyl]acetate and/or diethyl 1,4-cyclohexane dicarboxylate;

Green ingredients: 2-methyl-3-hexanone (E)-oxime, 2,4-dimethyl-3-cyclohexene-1-carbaldehyde, 2-tert-butyl-1-cyclohexyl acetate, styrallyl acetate, allyl (2-methylbutoxy)acetate, 4-methyl-3-decen-5-ol, diphenyl ether, (Z)-3-hexen-1-ol and/or 1-(5,5-dimethyl-1-cyclohexen-1-yl)-4-penten-1-one;

Musk ingredients: 1,4-dioxa-5,17-cycloheptadecanedione, (Z)-4-cyclopentadecen-1-one, 3-methylcyclopentadecanone, 1-oxa-12-cyclohexadecen-2-one, 1-oxa-13-cyclohexadecen-2-one, (9Z)-9-cycloheptadecen-1-one, 2-{1S}-1-[(1R)-3,3-dimethylcyclohexyl]ethoxy}-2-oxoethyl propionate 3-methyl-5-cyclopentadecen-1-one, 1,3,4,6,7,8-hexahydro-4,6,6,7,8,8-hexamethyl-cyclopenta-g-2-benzopyrane, (1S,1'R)-2-[1-(3',3'-dimethyl-1'-cyclohexyl)ethoxy]-2-methylpropyl propanoate, oxacyclohexadecan-2-one and/or (1S,1'R)-[1-(3',3'-dimethyl-1'-cyclohexyl) ethoxycarbonyl]methyl propanoate;

Woody ingredients: 1-[(1RS,6SR)-2,2,6-trimethylcyclohexyl]-3-hexanol, 3,3-dimethyl-5-[(1R)-2,2,3-trimethyl-3-cyclopenten-1-yl]-4-penten-2-ol, 3,4'-dimethylspiro[oxirane-2,9'-tricyclo[6.2.1.0$^{2.7}$]undec[4]ene, (1-ethoxyethoxy)cyclododecane, 2,2,9,11-tetramethylspiro[5.5]undec-8-en-1-yl acetate, 1-(octahydro-2,3,8,8-tetramethyl-2-naphtalenyl)-1-ethanone, patchouli oil, terpenes fractions of patchouli oil, Clearwood®, (1'R,E)-2-ethyl-4-(2',2',3'-trimethyl-3'-cyclopenten-1'-yl)-2-buten-1-ol, 2-ethyl-4-(2,2,3-trimethyl-3-cyclopenten-1-yl)-2-buten-1-ol, methyl cedryl ketone, 5-(2,2,3-trimethyl-3-cyclopentenyl)-3-methylpentan-2-ol, 1-(2,3,8,8-tetramethyl-1,2,3,4,6,7,8,8a-octahydronaphthalen-2-yl)ethan-1-one and/or isobornyl acetate;

Other ingredients (e.g. amber, powdery spicy or watery): dodecahydro-3a,6,6,9a-tetramethyl-naphtho[2,1-b]furan and any of its stereoisomers, heliotropin, anisic aldehyde, eugenol, cinnamic aldehyde, clove oil, 3-(1,3-benzodioxol-5-yl)-2-methylpropanal, 7-methyl-2H-1,5-benzodioxepin-3(4H)-one, 2,5,5-trimethyl-1,2,3,4,4a,5,6,7-octahydro-2-naphthalenol, 1-phenylvinyl acetate, 6-methyl-7-oxa-1-thia-4-azaspiro[4.4]nonan and/or 3-(3-isopropyl-1-phenyl)butanal.

A perfumery base according to the invention may not be limited to the above mentioned perfuming co-ingredients, and many other of these co-ingredients are in any case listed in reference texts such as the book by S. Arctander, *Perfume and Flavor Chemicals*, 1969, Montclair, N.J., USA, or its more recent versions, or in other works of a similar nature, as well as in the abundant patent literature in the field of perfumery. It is also understood that said co-ingredients may also be compounds known to release in a controlled manner various types of perfuming compounds also known as properfume or profragrance. Non-limiting examples of suitable properfume may include 4-(dodecylthio)-4-(2,6,6-trimethyl-2-cyclohexen-1-yl)-2-butanone, 4-(dodecylthio)-4-(2,6,6-trimethyl-1-cyclohexen-1-yl)-2-butanone, trans-3-(dodecylthio)-1-(2,6,6-trimethyl-3-cyclohexen-1-yl)-1-butanone, 2-(dodecylthio)octan-4-one, 2-phenylethyl oxo (phenyl)acetate, 3,7-dimethylocta-2,6-dien-1-yl oxo(phenyl)acetate, (Z)-hex-3-en-1-yl oxo(phenyl)acetate, 3,7-dimethyl-2,6-octadien-1-yl hexadecanoate, bis(3,7-dimethylocta-2,6-dien-1-yl) succinate, (2-((2-methylundec-1-en-1-yl)oxy)ethyl)benzene, 1-methoxy-4-(3-methyl-4-phenethoxybut-3-en-1-yl)benzene, (3-methyl-4-phenethoxybut-3-en-1-yl)benzene, 1-(((Z)-hex-3-en-1-yl)oxy)-2-methylundec-1-ene, (2-((2-methylundec-1-en-1-yl)oxy)ethoxy)benzene, 2-methyl-1-(octan-3-yloxy)undec-1-ene, 1-methoxy-4-(1-phenethoxyprop-1-en-2-yl)benzene, 1-methyl-4-(1-phenethoxyprop-1-en-2-yl)benzene, 2-(1-phenethoxyprop-1-en-2-yl)naphthalene, (2-phenethoxyvinyl)benzene, 2-(1-((3,7-dimethyloct-6-en-1-yl)oxy)prop-1-en-2-yl)naphthalene, (2-((2-pentylcyclopentylidene)methoxy)ethyl)benzene or a mixture thereof.

By "perfumery adjuvant", it is meant here an ingredient capable of imparting additional added benefit such as a color, a particular light resistance, chemical stability, etc. A detailed description of the nature and type of adjuvant commonly used in perfuming composition cannot be exhaustive, but it has to be mentioned that said ingredients are well known to a person skilled in the art. One may cite as specific non-limiting examples the following: viscosity agents (e.g. surfactants, thickeners, gelling and/or rheology modifiers), stabilizing agents (e.g. preservatives, antioxidant, heat/light and or buffers or chelating agents, such as BHT), coloring agents (e.g. dyes and/or pigments), preservatives (e.g. antibacterial or antimicrobial or antifungal or anti irritant agents), abrasives, skin cooling agents, fixatives, insect repellants, ointments, vitamins and mixtures thereof.

It is understood that a person skilled in the art is perfectly able to design optimal formulations for the desired effect by admixing the above mentioned components of a perfuming composition, simply by applying the standard knowledge of the art as well as by trial and error methodologies.

An invention's composition consisting of at least one compound of formula (I) and at least one perfumery carrier consists of a particular embodiment of the invention as well as a perfuming composition comprising at least one compound of formula (I), at least one perfumery carrier, at least one perfumery base, and optionally at least one perfumery adjuvant.

According to a particular embodiment, the compositions mentioned above, comprise more than one compound of formula (I) and enable the perfumer to prepare accords or perfumes possessing the odor tonality of various compounds of the invention, creating thus new building block for creation purposes.

For the sake of clarity, it is also understood that any mixture resulting directly from a chemical synthesis, e.g. a reaction medium without an adequate purification, in which the compound of the invention would be involved as a starting, intermediate or end-product could not be considered as a perfuming composition according to the invention as far as said mixture does not provide the inventive compound in a suitable form for perfumery. Thus, unpurified reaction mixtures are generally excluded from the present invention unless otherwise specified.

The invention's compound can also be advantageously used in all the fields of modern perfumery, i.e. fine or functional perfumery, to positively impart or modify the odor of a consumer product into which said compound (I) is added. Consequently, another object of the present invention consists of by a perfumed consumer product comprising, as a perfuming ingredient, at least one compound of formula (I), as defined above.

The invention's compound can be added as such or as part of an invention's perfuming composition.

For the sake of clarity, "perfumed consumer product" is meant to designate a consumer product which delivers at least a pleasant perfuming effect to the surface or space to which it is applied (e.g. skin, hair, textile, or home surface). In other words, a perfumed consumer product according to the invention is a perfumed consumer product which comprises a functional formulation, as well as optionally additional benefit agents, corresponding to the desired consumer product, and an olfactive effective amount of at least one invention's compound. For the sake of clarity, said perfumed consumer product is a non-edible product.

The nature and type of the constituents of the perfumed consumer product do not warrant a more detailed description here, which in any case would not be exhaustive, the skilled person being able to select them on the basis of his general knowledge and according to the nature and the desired effect of said product.

Non-limiting examples of suitable perfumed consumer products include a perfume, such as a fine perfume, a splash or eau de parfum, a cologne or a shave or after-shave lotion; a fabric care product, such as a liquid or solid detergent, a fabric softener, a liquid or solid scent booster, a fabric refresher, an ironing water, a paper, a bleach, a carpet cleaner, a curtain-care product; a body-care product, such as a hair care product (e.g. a shampoo, a coloring preparation or a hair spray, a color-care product, a hair shaping product, a dental care product), a disinfectant, an intimate care product; a cosmetic preparation (e.g. a skin cream or lotion, a vanishing cream or a deodorant or antiperspirant (e.g. a spray or roll on), a hair remover, a tanning or sun or after sun product, a nail product, a skin cleansing, a makeup); or a skin-care product (e.g. a soap, a shower or bath mousse, oil or gel, or a hygiene product or a foot/hand care products); an air care product, such as an air freshener or a "ready to use" powdered air freshener which can be used in the home space (rooms, refrigerators, cupboards, shoes or car) and/or in a public space (halls, hotels, malls, etc.); or a home care product, such as a mold remover, a furnisher care product, a wipe, a dish detergent or a hard-surface (e.g. a floor, bath, sanitary or a window-cleaning) detergent; a leather care product; a car care product, such as a polish, a wax or a plastic cleaner.

The proportions in which the compounds according to the invention can be incorporated into the various aforementioned products or compositions vary within a wide range of values. These values are dependent on the nature of the article to be perfumed and on the desired organoleptic effect as well as on the nature of the co-ingredients in a given base when the compounds according to the invention are mixed with perfuming co-ingredients, solvents or additives commonly used in the art.

For example, in the case of perfuming compositions, typical concentrations are in the order of 0.001% to 10% by weight, or even more, of the compounds of the invention based on the weight of the composition into which they are incorporated. In the case of perfumed consumer product, typical concentrations are in the order of 0.0001% to 5% by weight, or even more, of the compounds of the invention based on the weight of the consumer product into which they are incorporated.

Some of the above-mentioned perfumed consumer products may represent an aggressive medium for the invention's compounds, so that it may be necessary to protect the latter from premature decomposition, for example by encapsulation or by chemically binding it to another chemical which is suitable to release the invention's ingredient upon a suitable external stimulus, such as an enzyme, light, heat or a change of pH.

So, another object of the present invention is a properfume compound suitable to release the compound of formula

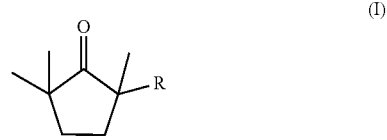

(I)

in the form of any one of its stereoisomers or as a mixture thereof, wherein R represents a $C_{2-8}$ alkenyl or $C_{4-8}$ alkadienyl group.

The invention's compounds can be prepared according to standard method known in the art as described herein-below.

EXAMPLES

The invention will now be described in further detail by way of the following examples, wherein the abbreviations have the usual meaning in the art, the temperatures are indicated in degrees centigrade (° C.). NMR spectra were acquired using either a Bruker Avance II Ultrashield 400 plus operating at 400 MHz, ($^1$H) and 100 MHz ($^{13}$C) or a Bruker Avance III 500 operating at 500 MHz ($^1$H) and 125 MHz ($^{13}$C) or a Bruker Avance III 600 cryoprobe operating at 600 MHz ($^1$H) and 150 MHz ($^{13}$C). Spectra were internally referenced relative to tetramethyl silane 0.0 ppm. $^1$H NMR signal shifts are expressed in δ ppm, coupling constants (J) are expressed in Hz with the following multiplicities: s, singlet; d, doublet; t, triplet; q, quartet; m, multiplet; b, broad (indicating unresolved couplings) and were interpreted using Bruker Topspin software. $^{13}$C NMR data are expressed in chemical shift δ ppm and hybridization from DEPT 90 and DEPT 135 experiments, C, quaternary; CH, methine; CH$_2$, methylene; CH$_3$, methyl.

Example 1

Synthesis of Compounds of Formula (I)

2-(but-3-en-1-yl)-2,5,5-trimethylcyclopentan-1-one

Step 1: ethyl 1-(but-3-en-1-yl)-2-oxocyclopentane-1-carboxylate

To a solution of ethyl 2-cyclopentanecarboxylate (20 g, 128 mmol, 1 equiv.), potassium carbonate (39.8 g, 288 mmol, 2.25 equiv.) and potassium iodide (6.38 g, 38.4 mmol, 0.3 equiv.) in acetone (256 mL) at r.t. was added 4-bromobut-1-ene (13.3 mL, 131 mol, 1.02 equiv.) dropwise. The reaction was refluxed for two days. It was allowed to cool down and acetone was evaporated under reduced pressure. A saturated solution of ammonium chloride was added and the residue was extracted three times with ether. The combined organic extracts were washed with brine, dried over sodium sulfate, filtered and concentrated under reduced pressure. The residue was used as such for the next step.

Step 2: 2-(but-3-en-1-yl)cyclopentan-1-one

To a solution of ethyl 1-(but-3-en-1-yl)-2-oxocyclopentane-1-carboxylate (26.9 g, 128 mmol, 1 equiv.) in methanol (300 mL) was added a 6 M HCl aqueous solution (150 mL, 900 mmol, 7 equiv.) and the mixture was refluxed for 3 days. It was allowed to cool down and methanol was evaporated under reduced pressure. The residue was extracted three times with ether. The combined organic extracts were washed with a saturated solution of sodium bicarbonate, dried over sodium sulfate, filtered and concentrated under reduced pressure. The residue was purified by bulb-to-bulb distillation (105-110° C., 2-4 mbar) to afford 2-(but-3-en-1-yl)cyclopentan-1-one as an oil (6.41 g, 36% yield over two steps).

$^1$H NMR (CDCl$_3$, 400 MHz): δ 1.32 (m, 1H), 1.49 (m, 1H), 1.70-1.80 (m, 1H), 1.86 (m, 1H), 1.95-2.31 (m, 7H), 4.94 (m, 1H), 5.01 (m, 1H), 5.76 (m, 1H).

$^{13}$C NMR (CDCl$_3$, 100 MHz): δ 221.4 (s), 138.1 (d), 115.1 (t), 48.5 (d), 38.2 (t), 31.6 (t), 29.6 (t), 28.9 (t), 20.8 (t).

Step 3: 2-(but-3-en-1-yl)-2,5,5-trimethylcyclopentan-1-one

In a tri-necked flask equipped with a thermometer and an addition funnel was introduced a suspension of KH (30% in oil, 3.87 g, 28.9 mmol, 4 equiv.). It was washed three times with pentane in order to remove most of the oil. 10 mL of THF were added dropwise, followed by a solution of 2-(but-3-en-1-yl)cyclopentan-1-one (1 g, 7.24 mmol, 1 equiv.) in 5 mL of THF. After stirring at r.t. for 3 h, iodomethane (1.81 mL, 28.9 mmol, 4 equiv.) was added dropwise. After stirring at r.t. for 1 h, the reaction was quenched with a saturated solution of ammonium chloride and extracted with ether twice. The combined organic extracts were dried over sodium sulfate, filtered and concentrated in vacuo. The residue was purified by bulb-to-bulb distillation (10 mbar, 120° C.) to afford 2-(but-3-en-1-yl)-2,5,5-trimethylcyclopentan-1-one as an oil (850 mg, 65% yield).

$^1$H NMR (CDCl$_3$, 400 MHz): δ 1.00 (s, 3H), 1.01 (s, 3H), 1.06 (s, 3H), 1.42-1.55 (m, 2H), 1.63-1.69 (m, 1H), 1.74-1.77 (m, 2H), 1.85-1.95 (m, 2H), 2.02-2.11 (m, 1H), 4.92 (m, 1H), 4.99 (m, 1H), 5.77 (m, 1H).

$^{13}$C NMR (CDCl$_3$, 100 MHz): δ 226.5 (s), 138.6 (d), 114.5 (t), 48.8 (s), 45.3 (s), 36.7 (t), 34.9 (t), 32.1 (t), 28.8 (t), 25.3 (q), 24.5 (q), 22.9 (q).

2-allyl-2,5,5-trimethylcyclopentan-1-one

Step 1: ethyl 1-allyl-2-oxocyclopentane-1-carboxylate

To a solution of ethyl 2-cyclopentanecarboxylate (25 g, 160 mmol, 1 equiv.), potassium carbonate (48.7 g, 352 mmol, 2.2 equiv.) and potassium iodide (7.97 g, 48.0 mmol, 0.3 equiv.) in acetone (457 mL) at r.t. was allyl bromide (13.9 mL, 160 mol, 1 equiv.) dropwise. The reaction was refluxed for 17 h. It was allowed to cool down and acetone was evaporated under reduced pressure. A saturated solution of ammonium chloride was added and the residue was extracted three times with ether. The combined organic extracts were washed with brine, dried over sodium sulfate, filtered and concentrated under reduced pressure. The residue was used as such for the next step.

Step 2: 2-allylcyclopentan-1-one

To a solution of ethyl 1-allyl-2-oxocyclopentane-1-carboxylate (31.4 g, 160 mmol, 1 equiv.) in methanol (400 mL) was added a 6 M HCl aqueous solution (192 mL, 1.15 mol, 7.2 equiv.) and the mixture was refluxed for 38 h. It was allowed to cool down and methanol was evaporated under reduced pressure. The residue was extracted three times with ether. The combined organic extracts were washed with a saturated solution of sodium bicarbonate, dried over sodium sulfate, filtered and concentrated under reduced pressure. The residue was purified by bulb-to-bulb distillation (100-105° C., 50 mbar) to afford 2-allylcyclopentan-1-one as an oil (14.5 g, 73% yield over two steps).

$^1$H NMR (CDCl$_3$, 400 MHz): δ 1.54-1.60 (m, 1H), 1.71-1.80 (m, 1H), 1.95-2.19 (m, 5H), 2.30 (m, 1H), 2.49 (m, 1H), 4.98-5.07 (m, 2H), 5.74 (m, 1H).

$^{13}$C NMR (CDCl$_3$, 100 MHz): δ 220.5 (s), 136.0 (d), 116.4 (t), 48.6 (d), 38.2 (t), 33.9 (t), 29.0 (t), 20.7 (t).

Step 3: 2-allyl-2,5,5-trimethylcyclopentan-1-one

In a tri-necked flask equipped with a thermometer and an addition funnel was introduced a suspension of KH (30% in oil, 43.1 g, 322 mmol, 4 equiv.). It was washed three times with pentane in order to remove most of the oil. 100 mL of THF were added dropwise, followed by a solution of 2-allylcyclopentan-1-one (10 g, 80.5 mmol, 1 equiv.) in 60 mL of THF. After stirring at r.t. for 10 min, iodomethane (30.2 mL, 483 mmol, 6 equiv.) was added dropwise. After stirring at r.t. for 1 h, the reaction was quenched with a saturated solution of ammonium chloride and extracted with ether twice. The combined organic extracts were dried over sodium sulfate, filtered and concentrated in vacuo. The residue was purified by bulb-to-bulb distillation (25 mbar, 105° C.) to afford 2-allyl-2,5,5-trimethylcyclopentan-1-one as an oil (10.4 g, 78% yield).

$^1$H NMR (CDCl$_3$, 500 MHz): δ 0.98 (s, 3H), 1.00 (s, 3H), 1.05 (s, 3H), 1.60 (m, 1H), 1.69-1.78 (m, 2H), 1.90 (m, 1H), 2.08 (m, 1H), 2.17 (m, 1H), 5.00-5.06 (m, 2H), 5.66 (m, 1H).

$^{13}$C NMR (CDCl$_3$, 125 MHz): δ 226.3 (s), 134.1 (d), 118.1 (t), 48.9 (s), 45.3 (s), 41.9 (t), 34.8 (t), 31.4 (t), 25.2 (q), 24.2 (q), 23.1 (q).

2-(hex-5-en-1-yl)-2,5,5-trimethylcyclopentan-1-one

Step 1: ethyl 1-(hex-5-en-1-yl)-2-oxocyclopentane-1-carboxylate

To a solution of ethyl 2-oxocyclopentane-1-carboxylate (56 mL, 375 mmol, 1 equiv.) in acetone (871 mL) at r.t. was rapidly added potassium carbonate (118 g, 845 mmol, 2.25 equiv.) and potassium iodide (20 g, 120 mmol, 0.32 equiv.). After stirring for 10 min, a solution of 6-bromohex-1-ene (51 mL, 381 mmol, 1.01 equiv.) in acetone (232 ml) was added and the reaction was refluxed for 19 h. Diethyl ether (900 mL) was added, the mixture was filtered on a Celite pad and the solvent was evaporated. The residue was diluted with ether, washed with water and brine, dried over sodium sulfate, filtered and concentrated in vacuo to afford ethyl 1-(hex-5-en-1-yl)-2-oxocyclopentane-1-carboxylate as an oil (93.3 g, 91% purity, 95% yield).

$^1$H NMR (CDCl$_3$, 400 MHz): δ 1.25 (t, J=7.1 Hz, 3H), 1.27-1.42 (m, 4H), 1.53-1.59 (m, 1H), 1.86-2.07 (m, 6H), 2.21-2.28 (m, 1H), 2.37-2.44 (m, 1H), 2.50-2.56 (m, 1H), 4.11-4.21 (m, 2H), 4.92-5.01 (m, 2H), 5.73-5.82 (m, 1H).

$^{13}$C NMR (CDCl$_3$, 100 MHz): δ 215.0 (s), 171.1 (s), 138.6 (d), 114.5 (t), 61.3 (t), 60.5 (s), 38.0 (t), 33.7 (t), 33.4 (t), 32.7 (t), 29.1 (t), 24.3 (t), 19.6 (t), 14.1 (q).

Step 2: 2-(hex-5-en-1-yl)cyclopentan-1-one

To a solution of ethyl 1-(hex-5-en-1-yl)-2-oxocyclopentane-1-carboxylate (93.3 g, 91% purity, 356 mmol, 1 equiv.) in methanol (860 mL) at r.t. was added a 6 M aqueous HCl solution (428 mL, 2.57 mol, 7.2 equiv.) dropwise. The reaction was refluxed for 6 days. Diethyl ether was added and the aqueous layer was extracted with ether twice. The combined organic extracts were washed sequentially with water, a saturated solution of sodium bicarbonate, water and brine, dried over sodium sulfate, filtered and concentrated in vacuo. The residue was purified by distillation on a Vigreux column (92-93° C., 1.5 mbar) to afford 2-(hex-5-en-1-yl) cyclopentan-1-one as an oil (42.0 g, 71% yield).

$^1$H NMR (CDCl$_3$, 400 MHz): δ 1.21-1.44 (m, 5H), 1.46-1.56 (m, 1H), 1.71-1.83 (m, 2H), 1.96-2.15 (m, 5H), 2.18-2.33 (m, 2H), 4.91-5.02 (m, 2H), 5.74-5.85 (m, 1H).

$^{13}$C NMR (CDCl$_3$, 100 MHz): δ 221.5 (s), 138.9 (d), 114.4 (t), 49.1 (d), 38.2 (t), 33.6 (t), 29.6 (t), 29.5 (t), 28.9 (t), 27.0 (t), 20.8 (t).

Step 3: 2-(hex-5-en-1-yl)-2,5,5-trimethylcyclopentan-1-one

In a tri-necked flask equipped with a thermometer and an addition funnel was introduced a suspension of KH (30% in oil, 3.54 g, 26.5 mmol, 4 equiv.). It was washed three times with pentane in order to remove most of the oil. 8 mL of THF were added dropwise, followed by a solution of 2-(hex-5-en-1-yl)cyclopentan-1-one (1.1 g, 6.62 mmol, 1 equiv.) in 5 mL of THF. After stirring at r.t. for 10 min, iodomethane (2.48 mL, 39.7 mmol, 6 equiv.) was added dropwise. After stirring at r.t. for 1 h, the reaction was quenched with a saturated solution of ammonium chloride and extracted with ether twice. The combined organic extracts were dried over sodium sulfate, filtered and concentrated in vacuo. The residue was purified by bulb-to-bulb distillation (2-4 mbar, 120° C.) to afford 2-(hex-5-en-1-yl)-2,5,5-trimethylcyclopentan-1-one as an oil (1.30 g, 94% yield).

$^1$H NMR (CDCl$_3$, 500 MHz): δ 0.99 (s, 3H), 0.99 (s, 3H), 1.05 (s, 3H), 1.09-1.19 (m, 1H), 1.30-1.43 (m, 5H), 1.63 (m, 1H), 1.71-1.78 (m, 2H), 1.86 (m, 1H), 2.01-2.05 (m, 2H), 4.90-4.99 (m, 2H), 5.77 (m, 1H).

$^{13}$C NMR (CDCl$_3$, 125 MHz): δ 227.0 (s), 138.8 (d), 114.4 (t), 49.0 (s), 45.3 (s), 37.3 (t), 34.9 (t), 33.6 (t), 32.0 (t), 29.4 (t), 25.3 (q), 24.4 (q), 23.9 (t), 23.0 (q).

(Z)-2-(hex-3-en-1-yl)-2,5,5-trimethylcyclopentan-1-one

Step 1: ethyl (Z)-1-(hex-3-en-1-yl)-2-oxocyclopentane-1-carboxylate

To a solution of ethyl 2-oxocyclopentane-1-carboxylate (4.63 mL, 31.1 mmol, 1 equiv.) in acetone (73 mL) at r.t. was rapidly added potassium carbonate (9.8 g, 70.2 mmol, 2.26 equiv.) and potassium iodide (1.65 g, 9.94 mmol, 0.32 equiv.). After stirring for 10 min, a solution of (Z)-1-chlorohex-3-ene (3.71 g, 31.3 mmol, 1.01 equiv.) in acetone (19 ml) was added and the reaction was refluxed for 6 days. Diethyl ether was added, the mixture was filtered on a Celite pad and the solvent was evaporated. The residue was diluted with ether, washed with water and brine, dried over sodium sulfate, filtered and concentrated in vacuo. The residue was used as such for the next step.

Step 2: (Z)-2-(hex-3-en-1-yl)cyclopentan-1-one

To a solution of ethyl (Z)-1-(hex-3-en-1-yl)-2-oxocyclopentane-1-carboxylate (5.56 g, 18.2 mmol, 1 equiv.) in methanol (47 mL) at r.t. was added a 6 M aqueous HCl solution (24 mL, 144 mol, 7.9 equiv.) dropwise. The reaction was refluxed for 4 days. Diethyl ether was added and the aqueous layer was extracted with ether twice. The combined organic extracts were washed sequentially with water, a saturated solution of sodium bicarbonate, water and brine, dried over sodium sulfate, filtered and concentrated in vacuo. The residue was purified by flash column chromatography on silica gel (Heptane/AcOEt 95:5) and bulb-to-bulb distillation (0.9-1.0 mbar, 105-125° C.) to afford (Z)-2-(hex-3-en-1-yl)cyclopentan-1-one as an oil (1.46 g, 48% yield).

$^1$H NMR (CDCl$_3$, 500 MHz): δ 0.94 (t, J=7.5 Hz, 3H), 1.30 (m, 1H), 1.52 (m, 1H), 1.71-1.84 (m, 2H), 1.96-2.13 (m, 7H), 2.21 (m, 1H), 2.28 (m, 1H), 5.28 (m, 1H), 5.38 (m, 1H).

$^{13}$C NMR (CDCl$_3$, 125 MHz): δ 221.5 (s), 132.5 (d), 128.2 (d), 48.6 (d), 38.2 (t), 29.7 (t), 29.7 (t), 25.0 (t), 20.8 (t), 20.6 (t), 14.4 (q).

Step 3: (Z)-2-(hex-3-en-1-yl)-2,5,5-trimethylcyclopentan-1-one

In a tri-necked flask equipped with a thermometer and an addition funnel was introduced a suspension of KH (30% in oil, 2.99 g, 22.4 mmol, 4.6 equiv.). It was washed three times with pentane in order to remove most of the oil. 7 mL of THF were added dropwise, followed by a solution of (Z)-2-(hex-3-en-1-yl)cyclopentan-1-one (806 mg, 4.85 mmol, 1 equiv.) in 4 mL of THF. After stirring at r.t. for 10 min, iodomethane (1.90 mL, 30.2 mmol, 6.2 equiv.) was added dropwise. After stirring at r.t. for 20 min, the reaction was quenched with a saturated solution of ammonium chloride and extracted with ether twice. The combined organic extracts were dried over sodium sulfate, filtered and concentrated in vacuo. The residue was purified by flash column chromatography on silica gel (Heptane/AcOEt 98:2) and bulb-to-bulb distillation (1.5 mbar, 115° C.) to afford (Z)-2-(hex-3-en-1-yl)-2,5,5-trimethylcyclopentan-1-one as an oil (608 mg, 60% yield).

$^1$H NMR (CDCl$_3$, 600 MHz): δ 0.94 (t, J=7.6 Hz, 3H), 1.01 (s, 3H), 1.02 (s, 3H), 1.06 (s, 3H), 1.38-1.47 (m, 2H), 1.66 (m, 1H), 1.73-1.78 (m, 2H), 1.84-1.92 (m, 2H), 1.98-2.07 (m, 3H), 5.27 (m, 1H), 5.34 (m, 1H).

$^{13}$C NMR (CDCl$_3$, 150 MHz): δ 226.6 (s), 132.0 (d), 128.6 (d), 49.0 (s), 45.3 (s), 37.5 (t), 34.9 (t), 32.1 (t), 25.3 (q), 24.5 (q), 22.9 (q), 22.3 (t), 20.4 (t), 14.3 (q).

(E)-2-(hex-4-en-1-yl)-2,5,5-trimethylcyclopentan-1-one

Step 1: ethyl (E)-1-(hex-4-en-1-yl)-2-oxocyclopentane-1-carboxylate

To a solution of ethyl 2-oxocyclopentane-1-carboxylate (7.41 mL, 49.7 mmol, 1 equiv.) in acetone (117 mL) at r.t. was rapidly added potassium carbonate (15.7 g, 112 mmol, 2.26 equiv.) and potassium iodide (2.64 g, 15.9 mmol, 0.32 equiv.). After stirring for 10 min, a solution of (E)-hex-4-en-1-yl methanesulfonate (8.93 g, 50.1 mmol, 1.01 equiv.) in acetone (30 ml) was added and the reaction was refluxed for 17 h. Diethyl ether was added, the mixture was filtered on a Celite pad and the solvent was evaporated. The residue was diluted with ether, washed with water and brine, dried over sodium sulfate, filtered and concentrated in vacuo. The residue was used as such for the next step.

Step 2: (E)-2-(hex-4-en-1-yl)cyclopentan-1-one

To a solution of ethyl (E)-1-(hex-4-en-1-yl)-2-oxocyclopentane-1-carboxylate (12.6 g, 44.4 mmol, 1 equiv.) in methanol (115 mL) at r.t. was added a 6 M aqueous HCl solution (57 mL, 342 mol, 7.7 equiv.) dropwise. The reaction was refluxed for 3 days. Diethyl ether was added and the aqueous layer was extracted with ether twice. The combined organic extracts were washed sequentially with water, a saturated solution of sodium bicarbonate, water and brine, dried over sodium sulfate, filtered and concentrated in vacuo. The residue was purified by flash column chromatography on silica gel (Heptane/AcOEt 95:5) and bulb-to-bulb distillation (4.9-6.6.10-3 mbar, 60-65° C.) to afford (E)-2-(hex-4-en-1-yl)cyclopentan-1-one as an oil (4.74 g, 64% yield).

$^1$H NMR (CDCl$_3$, 400 MHz): δ 1.17-1.26 (m, 1H), 1.32-1.40 (m, 2H), 1.44-1.54 (m, 1H), 1.60-1.62 (m, 3H), 1.68-1.80 (m, 2H), 1.93-2.12 (m, 5H), 2.14-2.30 (m, 2H), 5.33-5.44 (m, 2H).

$^{13}$C NMR (CDCl$_3$, 100 MHz): δ 221.5 (s), 131.0 (d), 125.1 (d), 49.1 (d), 38.2 (t), 32.6 (t), 29.6 (t), 29.3 (t), 27.6 (t), 20.8 (t), 17.9 (q).

Step 3: (E)-2-(hex-4-en-1-yl)-2,5,5-trimethylcyclopentan-1-one

In a tri-necked flask equipped with a thermometer and an addition funnel was introduced a suspension of KH (30% in oil, 4.61 g, 34.5 mmol, 5.7 equiv.). It was washed three times with pentane in order to remove most of the oil. 8 mL of THF were added dropwise, followed by a solution of (E)-2-(hex-4-en-1-yl)cyclopentan-1-one (1 g, 6.01 mmol, 1 equiv.) in 5 mL of THF. After stirring at r.t. for 10 min, iodomethane (2.30 mL, 36.6 mmol, 6.1 equiv.) was added dropwise. After stirring at r.t. for 1 h 40, the reaction was quenched with a saturated solution of ammonium chloride and extracted with ether twice. The combined organic extracts were dried over sodium sulfate, filtered and concentrated in vacuo. The residue was purified by flash column chromatography on silica gel (Heptane/AcOEt 95:5) and bulb-to-bulb distillation (0.5 mbar, 125° C.) to afford (E)-2-(hex-4-en-1-yl)-2,5,5-trimethylcyclopentan-1-one as an oil (983 mg, 78% yield).

$^1$H NMR (CDCl$_3$, 600 MHz): δ 0.98 (s, 3H), 0.99 (s, 3H), 1.04 (s, 3H), 1.13-1.20 (m, 1H), 1.30-1.41 (m, 3H), 1.56-1.64 (m, 4H), 1.69-1.76 (m, 2H), 1.83-1.88 (m, 1H), 1.90-1.94 (m, 2H), 5.34-5.42 (m, 2H).

$^{13}$C NMR (CDCl$_3$, 150 MHz): δ 226.9 (s), 131.0 (d), 125.1 (d), 48.9 (s), 45.3 (s), 37.1 (t), 34.9 (t), 33.1 (t), 32.0 (t), 25.3 (q), 24.5 (t), 24.4 (q), 23.1 (q), 17.9 (q).

(Z)-2-(hex-4-en-1-yl)-2,5,5-trimethylcyclopentan-1-one

Step 1: ethyl (Z)-1-(hex-4-en-1-yl)-2-oxocyclopentane-1-carboxylate

To a solution of ethyl 2-oxocyclopentane-1-carboxylate (4.80 mL, 32.2 mmol, 1 equiv.) in acetone (73 mL) at r.t. was rapidly added potassium carbonate (9.80 g, 70.2 mmol, 2.18 equiv.) and potassium iodide (1.65 g, 9.94 mmol, 0.31 equiv.). After stirring for 10 min, a solution of (Z)-6-chlorohex-2-ene (4.60 mL, 32.1 mmol, 1 equiv.) in acetone (19 ml) was added and the reaction was refluxed for 5 days. Diethyl ether was added, the mixture was filtered on a Celite pad and the solvent was evaporated. The residue was diluted with ether, washed with water and brine, dried over sodium sulfate, filtered and concentrated in vacuo. The residue was used as such for the next step.

Step 2: (Z)-2-(hex-4-en-1-yl)cyclopentan-1-one

To a solution of ethyl (Z)-1-(hex-4-en-1-yl)-2-oxocyclopentane-1-carboxylate (7.65 g, 29.2 mmol, 1 equiv.) in methanol (76 mL) at r.t. was added a 6 M aqueous HCl solution (38 mL, 228 mol, 7.8 equiv.) dropwise. The reaction was refluxed for 4 days. Diethyl ether was added and the aqueous layer was extracted with ether twice. The combined organic extracts were washed sequentially with water, a saturated solution of sodium bicarbonate, water and brine, dried over sodium sulfate, filtered and concentrated in vacuo. The residue was purified by flash column chromatography on silica gel (Heptane/AcOEt 95:5) and bulb-to-bulb distillation (0.2-0.3 mbar, 100-120° C.) to afford (Z)-2-(hex-4-en-1-yl)cyclopentan-1-one as an oil (1.97 g, 64% yield).

$^1$H NMR (CDCl$_3$, 500 MHz): δ 1.20-1.28 (m, 1H), 1.33-1.42 (m, 2H), 1.46-154 (m, 1H), 1.56-1.57 (m, 3H), 1.70-1.79 (m, 2H), 1.94-2.11 (m, 5H), 2.16-2.22 (m, 1H), 2.23-2.30 (m, 1H), 5.34 (m, 1H), 5.42 (m, 1H).

$^{13}$C NMR (CDCl$_3$, 125 MHz): δ 221.4 (s), 130.2 (d), 124.1 (d), 49.1 (d), 38.2 (t), 29.6 (t), 29.4 (t), 27.6 (t), 26.8 (t), 20.8 (t), 12.8 (q).

Step 3: (Z)-2-(hex-4-en-1-yl)-2,5,5-trimethylcyclopentan-1-one

In a tri-necked flask equipped with a thermometer and an addition funnel was introduced a suspension of KH (30% in oil, 3.19 g, 19.9 mmol, 4.34 equiv.). It was washed three times with pentane in order to remove most of the oil. 7 mL of THF were added dropwise, followed by a solution of (Z)-2-(hex-4-en-1-yl)cyclopentan-1-one (778 mg, 4.59 mmol, 1 equiv.) in 4 mL of THF. After stirring at r.t. for 10 min, iodomethane (1.80 mL, 28.6 mmol, 6.24 equiv.) was added dropwise. After stirring at r.t. for 40 min, the reaction was quenched with a saturated solution of ammonium chloride and extracted with ether twice.

The combined organic extracts were dried over sodium sulfate, filtered and concentrated in vacuo. The residue was purified by flash column chromatography on silica gel (Heptane/AcOEt 98:2) and bulb-to-bulb distillation (1.6 mbar, 115-120° C.) to afford (Z)-2-(hex-4-en-1-yl)-2,5,5-trimethylcyclopentan-1-one as an oil (567 mg, 58% yield).

$^1$H NMR (CDCl$_3$, 600 MHz): δ 0.98 (s, 3H), 0.99 (s, 3H), 1.04 (s, 3H), 1.14-1.21 (m, 1H), 1.32-1.43 (m, 3H), 1.56-1.57 (m, 3H), 1.62 (m, 1H), 1.70-1.77 (m, 2H), 1.86 (m, 1H), 1.97-2.01 (m, 2H), 5.30-5.35 (m, 1H), 5.39-5.45 (m, 1H).

$^{13}$C NMR (CDCl$_3$, 150 MHz): δ 226.9 (s), 130.2 (d), 124.1 (d), 49.0 (s), 45.3 (s), 37.1 (t), 34.9 (t), 32.0 (t), 27.3 (t), 25.3 (q), 24.4 (t), 24.4 (q), 23.1 (q), 12.8 (q).

(E)-2-(hex-3-en-1-yl)-2,5,5-trimethylcyclopentan-1-one

Step 1: ethyl (E)-1-(hex-3-en-1-yl)-2-oxocyclopentane-1-carboxylate

To a solution of ethyl 2-oxocyclopentane-1-carboxylate (7.41 mL, 49.7 mmol, 1 equiv.) in acetone (117 mL) at r.t. was rapidly added potassium carbonate (15.7 g, 112 mmol, 2.26 equiv.) and potassium iodide (2.64 g, 15.9 mmol, 0.32 equiv.). After stirring for 10 min, a solution of (E)-hex-3-en-1-yl methanesulfonate (8.98 g, 50.4 mmol, 1.01 equiv.) in acetone (30 ml) was added and the reaction was refluxed for 4 days. Diethyl ether was added, the mixture was filtered on a Celite pad and the solvent was evaporated. The residue was diluted with ether, washed with water and brine, dried over sodium sulfate, filtered and concentrated in vacuo. The residue was used as such for the next step.

Step 2: (E)-2-(hex-3-en-1-yl)cyclopentan-1-one

To a solution of ethyl (E)-1-(hex-3-en-1-yl)-2-oxocyclopentane-1-carboxylate (10.8 g, 41.4 mmol, 1 equiv.) in methanol (107 mL) at r.t. was added a 6 M aqueous HCl solution (53 mL, 318 mol, 7.7 equiv.) dropwise. The reaction was refluxed for 4 days. Diethyl ether was added and the aqueous layer was extracted with ether twice. The combined organic extracts were washed sequentially with water, a saturated solution of sodium bicarbonate, water and brine, dried over sodium sulfate, filtered and concentrated in vacuo. The residue was purified by flash column chromatography on silica gel (Heptane/AcOEt 95:5) and bulb-to-bulb distillation (0.1-0.2 mbar, 95-105° C.) to afford (E)-2-(hex-3-en-1-yl)cyclopentan-1-one as an oil (4.27 g, 62% yield).

$^1$H NMR (CDCl$_3$, 500 MHz): δ 0.92 (t, J=7.5 Hz, 3H), 1.28 (m, 1H), 1.48 (m, 1H), 1.69-1.84 (m, 2H), 1.93-2.11 (m, 7H), 2.19 (m, 1H), 2.26 (m, 1H), 5.33 (m, 1H), 5.44 (m, 1H).

$^{13}$C NMR (CDCl$_3$, 125 MHz): δ 221.6 (s), 132.9 (d), 128.3 (d), 48.5 (d), 38.2 (t), 30.4 (t), 29.6 (t), 29.6 (t), 25.6 (t), 20.8 (t), 13.9 (q).

Step 3: (E)-2-(hex-3-en-1-yl)-2,5,5-trimethylcyclopentan-1-one

In a tri-necked flask equipped with a thermometer and an addition funnel was introduced a suspension of KH (30% in oil, 8.30 g, 51.7 mmol, 8.6 equiv.). It was washed three times with pentane in order to remove most of the oil. 10 mL of THF were added dropwise, followed by a solution of (E)-2-(hex-3-en-1-yl)cyclopentan-1-one (1 g, 6.01 mmol, 1 equiv.) in 6 mL of THF. After stirring at r.t. for 10 min, iodomethane (2.40 mL, 38.2 mmol, 6.3 equiv.) was added dropwise. After stirring at r.t. for 15 min, the reaction was quenched with a saturated solution of ammonium chloride and extracted with ether twice. The combined organic extracts were dried over sodium sulfate, filtered and concentrated in vacuo. The residue was purified by flash column chromatography on silica gel (Heptane/AcOEt 98:2) and bulb-to-bulb distillation (1.3-1.4 mbar, 115-120° C.) to afford (E)-2-(hex-3-en-1-yl)-2,5,5-trimethylcyclopentan-1-one as an oil (1.07 g, 84% yield).

$^1$H NMR (CDCl$_3$, 600 MHz): δ 0.93 (t, J=7.4 Hz, 3H), 0.99 (s, 3H), 1.00 (s, 3H), 1.05 (s, 3H), 1.40-1.49 (m, 2H), 1.64 (m, 1H), 1.73-1.75 (m, 2H), 1.79-1.90 (m, 2H), 1.94-2.02 (m, 3H), 5.34 (m, 1H), 5.44 (m, 1H).

$^{13}$C NMR (CDCl$_3$, 150 MHz): δ 226.7 (s), 132.2 (d), 128.8 (d), 48.9 (s), 45.3 (s), 37.5 (t), 34.9 (t), 32.0 (t), 27.6 (t), 25.6 (t), 25.3 (q), 24.4 (q), 23.0 (q), 13.9 (q).

(+-)-2,2,5-trimethyl-5-[(1E)-1-penten-1-yl]cyclopentanone (E)-2-pentylidene-1-cyclopentanone (3.4 g, 22.3 mmol, prepared according to R. Mahrwald, H. Schick, *Synthesis*, 1990, 592; T. Nakano et al. *J. Org. Chem.* 1987, 52, 2239) was added dropwise over 10 minutes to a soln of tBuOK (9.76 g, 67 mmol) in THF (80 ml) at 20-25° C. After 2 h at 50° C. the red solution was cooled down to 20° C., and MeI (9.5 g, 67 mmol) was added dropwise so that the temperature does not exceed 27° C. The reaction was stirred for 1 h at 20° C., then refluxed (75° C.) for 2 h. The reaction was poured onto ice/water, then extracted with ether. The org phase was washed twice with H$_2$O and brine, dried over Na$_2$SO$_4$, filtered and concentrated to afford 4 g of an orange oil. A purification over a 50 g SiO$_2$ cartridge with cyclohexane/AcOEt 99/1 afforded 1.68 g 77% pure. A second chromatography on 40 g of Al$_2$O$_3$ with the same solvent mixture afforded 1.23 g as a 92:8 E/Z mixture after bulb to bulb distillation Bp 60° C./0.07 mbars (28% yield).

$^1$H-NMR: 5.46-5.35 (m, 2H); 2.05-1.94 (m, 2H); 1.80-1.72 (m, 4H); 1.36 (q, J=7.0, 2H); 1.13 (s, 3H); 1.043 (s, 3H); 1.040 (s, 3H); 0.86 (t, J=7.0, 3H).

$^{13}$C-NMR: 224.2 (s); 133.1 (d); 129.8 (d); 51.7 (s); 45.2 (s); 34.9 (t); 34.7 (t); 33.4 (t); 22.5 (t); 25.1 (q); 25.0 (q); 24.1 (q); 13.5 (q).

(+-)-2-[(1E)-1-buten-1-yl]-2,5,5-trimethylcyclopentanone (E)-2-butylidene-1-cyclopentanone (5.5 g, 37.8 mmol, prepared according to E. Delort et al. *J. Agric. Food. Chem.* 2011, 59, 11752; R. Arnacke et al. *Lieb. Ann. Chem.* 1994, 891) was added dropwise over 10 minutes to a soln of tBuOK (14.85 g, 132.3 mmol) in THF (120 ml) at 20-25° C.

After 2 h at 50° C. the red solution was cooled down to 20° C., and MeI (17.17 g, 121.0 mmol) was added dropwise so that the temperature does not exceed 35° C. The reaction was stirred for 1 h at room temp then heated to 50° C. for 2 hours, then refluxed (75° C.) for 2 h. The reaction was poured onto ice/water, then extracted with Et$_2$O. The org phase was washed twice with H$_2$O and brine, dried over Na$_2$SO$_4$, filtered and evaporated to afford 6.2 g of an orange oil. A purification over a 120 g SiO$_2$ cartridge with cyclohexane/AcOEt 99/1 afforded:

Fr 7-15 1.0 g 77% (E)+9% (Z); Fr 16-27 1.5 g 89% (E)+5% (Z); Fr 28-36 308 mg 90% (E)+4% (Z).

All fractions were mixed and bulb-to-bulb distilled at 100° C./0.36 mbars to afford 1276 mg 94% (E)+6% (Z) (19% yield).

$^1$H-NMR: 5.50-5.34 (m, 2H); 2.05-1.98 (m, 2H); 1.79-1.73 (m, 2H); 1.12 (s, 3H); 1.048 (s, 3H); 1.040 (s, 3H); 0.95 (t, J=7.0, 3H).

$^{13}$C-NMR: 224.3 (s); 131.9 (d); 131.6 (d); 51.6 (s); 45.2 (s); 34.8 (t); 33.4 (t); 25.7 (t); 25.0 (2q); 24.1 (q); 13.7 (q).

(+-)-2-[(1E)-1-hexen-1-yl]-2,5,5-trimethylcyclopentanone (2E)-2-hexylidenecyclopentanone (2.15 g, 12 mmol, prepared according to W. Wang et al. *Org. Lett.* 2005, 7, 601; Science & Technology Corp. WO 2006/7586) was added dropwise over 10 minutes to a soln of tBuOK (4.04 g, 36 mmol) in THF (35 ml) at 20-25° C. After 3 h, MeI (5.11 g, 36 mmol) was added dropwise bellow 35° C. The reaction was stirred for 1 h at 20° C., then heated to 50° C. for 2 hours, and refluxed (75° C.) for 2 days. The reaction mixture was poured onto ice/water, and extracted with Et$_2$O. The org phase was washed twice with H$_2$O and brine, dried over Na$_2$SO$_4$, filtered and concentrated to afford an orange oil. A purification over an 80 g SiO$_2$ cartridge with cyclohexane/ethyl acetate 99/1 afforded: Fr 18-24 890 mg 93/7 (E/Z) mixture; Fr 25-31 460 mg 85:15 (E/Z) mixture, (54% yield).

$^1$H-NMR: 5.45-5.34 (m, 2H); 2.04-1.98 (m, 2H); 1.79-1.73 (m, 2H); 1.33-1.26 (m, 6H); 1.12 (s, 3H); 1.04 (s, 3H); 1.038 (s, 3H); 0.87 (t, J=7.0, 3H).

$^{13}$C-NMR: 224.3 (s); 132.8 (d); 130.1 (d); 51.7 (s); 45.2 (s); 34.8 (t); 33.4 (t); 32.3 (t); 31.5 (t); 25.1 (q); 25.0 (q); 24.1 (q); 22.1 (t); 13.9 (q).

(+-)-2,2,5-trimethyl-5-[(2Z)-2-penten-1-yl]cyclopentanone

Step 1: (+-)-2,2,5-trimethyl-5-(2-pentyn-1-yl)cyclopentanone 2-(pent-2-yn-1-yl)cyclopentan-1-one (3.0 g, 19.97 mmol, [4]) was added dropwise over 10 minutes to a suspension of 30% KH in min oil (8.0 g, 59.91 mmol) in THF (10 ml) at 20-25° C. After 1 h, MeI (8.5 g, 59.91 mmol) was added dropwise bellow 30° C. The reaction was stirred for 1 h at 20° C., then the reaction mixture was poured onto ice/water, then extracted with Et$_2$O. The org phase was washed twice with H$_2$O and brine, dried over Na$_2$SO$_4$, filtered and concentrated to afford an orange oil. A purification over a 80 g SiO$_2$ cartridge with cyclohexane/ethyl acetate 99/1 afforded the pure title compound in 85% yield after bulb-to-bulb distillation. Bp 100° C./0.29 mbars.

$^1$H-NMR: 2.33 (dt, J=3.0, 16.3, 1H); 2.20-2.17 (m, 1H); 2.16-2.10 (m, 2H); 1.84-1.76 (m, 2H); 1.75-1.67 (m, 2H); 1.095 (t. J=7.4, 3H); 1.09 (s, 3H); 1.05 (s, 3H); 1.03 (s, 3H).

$^{13}$C-NMR: 225.4 (s); 83.4 (s); 76.2 (s); 49.1 (s); 45.4 (s); 34.9 (t); 31.5 (t); 27.5 (t); 25.3 (q); 23.9 (q); 23.2 (q); 14.2 (q); 12.4 (t).

Step 2: (+-)-2,2,5-trimethyl-5-[(2Z)-2-penten-1-yl] cyclopentanone

A sol. of (+-)-2,2,5-trimethyl-5-(2-pentyn-1-yl)cyclopentanone (1.0 g, 5.2 mmol) in cyclohexane (10 ml) was hydrogenated over Lindlar catalyst (55.3 mg). After absorption of 1.0 mol-equiv of H$_2$, the reaction mixture was concentrated in vacuo and purified by CC/SiO$_2$ with cyclohexane/AcOEt 99:1 to afford pure material in 35% yield.

$^1$H-NMR: 5.52-5.46 (m, 1H); 5.30-5.21 (m, 1H); 2.14 (d, J=7.6, 2H); 2.07-1.99 (m, 2H); 1.94-1.88 (m, 1H); 1.77-1.73 (m, 2H); 1.65-1.59 (m, 1H); 1.07 (s, 3H); 1.02 (s, 3H); 1.00 (s, 3H); 0.95 (t, J=7.4, 3H).

$^{13}$C-NMR: 226.6 (s); 134.6 (d); 124.0 (d); 49.2 (s); 45.3 (s); 35.0 (t); 34.6 (t); 31.4 (t); 25.2 (q); 24.2 (q); 23.1 (q); 20.6 (t); 14.2 (q).

(E)-2,2,5-trimethyl-5-(pent-2-en-1-yl)cyclopentan-1-one

1$^{st}$ Step: (E)-2-(pent-2-en-1-yl)cyclopentan-1-one

An autoclave was charged with Citric Acid (15.6 g, 81 mmol), Triethylamine (8.2 g, 81 mmol), pent-1-en-3-ol (126.8 g, 1473 mmol), and 1,1-diethoxycyclopentane (233 g, 1473 mmol). The mixture was heated to 160° C. during 15 h. Cooled down to RT, quenched with HCl (5%), extracted with AcOEt, washed with H$_2$O and brine, dried over MgSO$_4$, filtered and concentrated to afford 234.4 g of crude.

The crude was purified by fractional distillation at 100° C./6.4 mbar to afford 179 g (80% yield)

$^1$H-NMR: 5.54-5.47 (m, 1H); 5.34-5.30 (m, 1H); 2.45-2.39 (m, 1H); 2.33-2.26 (m, 1H); 2.19-2.10 (m, 3H); 2.04-1.94 (m, 4H); 1.84-1.72 (m, 1H); 1.63-1.53 (m, 1H); 0.95 (t, J=7.44 Hz, 3H).

2$^{nd}$ step: (E)-2,2,5-trimethyl-5-(pent-2-en-1-yl)cyclopentan-1-one

To a suspension of KH (2.6 g, 19.7 mmol) in THF (20 mL) at RT was added (E)-2-(pent-2-en-1-yl)cyclopentan-1-one (1 g, 6.6 mmol) while keeping the reaction temperature below 30° C. After 30 minutes at RT, MeI (2.8 g, 19.7 mmol) was added dropwise in 20 minutes in order to control the strong exothermic reaction (temperature maximum:43° C.). The slurry was stirred during 40 minutes at RT then it was heated at 40° C. for 2 h. Partial conversion was observed. The reaction mixture was cooled to RT, quenched with NH$_4$Cl then extracted with Et$_2$O. The organic phase was washed twice with H$_2$O and brine, dried over Na$_2$SO$_4$, filtered and concentrated to afford 3.1 g of crude. After a purification by bulb to bulb distillation 1.2 g of partially permethylated product was obtained. The previous material was reacted again in the previously described reaction conditions and after purification 0.9 g of the desired product (75% yield).

$^1$H-NMR: 5.55-5.46 (m, 1H), 5.31-5.23 (m, 1H), 2.16-2.11 (m, 1H); 2.04-1.97 (m, 3H); 1.95-1.90 (m, 1H); 1.76-1.72 (m, 2H); 1.62-1.56 (m, 1H); 1.06 (s, 3H); 1.00 (s, 3H); 0.99 (s, 3H); 0.96 (t, J=7.4 Hz, 3H).

$^{13}$C-NMR: 226.6 (s); 135.9 (d); 124.2 (d); 49.2 (s); 45.4 (s); 40.5 (t); 34.9 (t); 31.2 (t); 25.6 (t); 25.2 (q); 24.1 (q); 23.4 (q); 13.8 (q).

(E)-2-(hex-2-en-1-yl)-2,5,5-trimethylcyclopentan-1-one

1$^{st}$ Step: (E)-2-(hex-2-en-1-yl)cyclopentan-1-one

To a solution of Cu(OAc)$_2$ (1.8 g, 0.009 mol, 0.15 equiv.) in AcOH (30 mL) was added Cyclopentanone (25 g, 0.3 mol, 5 equiv.), 1-hexene (5 g, 0.06 mol), Mn(OAc)$_3$ (16 g, 0.06 mol, 1 equiv.). The mixture was heated at 60° C. during 1 h30. The mixture was cooled down to RT. The suspension was filtrated over Celite/Filter Cel, the pad was washed with Et$_2$O (50 mL), washed with water (3×20 mL), NaHCO$_3$ sat.(1×20 mL), brine (1×20 mL) and dried over Na$_2$SO$_4$. The suspension was filtered and concentrated under vacuum. The crude was purified by a flash distillation in order to remove the excess of Cyclopentanone. And then purified by a silica gel chromatography (CyH/Et2O) to give (E)-2-(hex-2-en-1-yl)cyclopentan-1-one (27%) with a purity of 98%.

$^{1}$H NMR (400 MHz, CDCl$_3$): 5.50-5.40 (m, 1H), 5.39-5.29 (m, 1H), 2.49-2.38 (m, 1H), 2.36-2.23 (m, 1H), 2.21-1.90 (m, 7H), 1.85-1.71 (m, 1H), 1.65-1.52 (m, 1H), 1.43-1.29 (m, 2H), 0.88 (t, J=7.5 Hz, 3H).

$^{13}$C NMR (125 MHz, CDCl$_3$): 13.6 (q), 20.7 (t), 22.6 (t), 28.9 (t), 32.7 (t), 34.6 (t), 38.3 (t), 49.1 (d), 127.2 (d), 132.5 (d), 220.8 (s).

2$^{nd}$ step: (E)-2-(hex-2-en-1-yl)-2,5,5-trimethylcyclopentan-1-one

To KH (30% in oil, 2.4 g, 0.018 mol, 3 equiv.) in THF (20 mL) was added dropwise (E)-2-(hex-2-en-1-yl)cyclopentan-1-one while controlling the internal temperature. The suspension was stirred at RT for 30 min. Then CH$_3$I (2.6 g, 0.018 mol, 3 equiv.) was added dropwise in 25 min (a strong exothermy was observed). The white suspension was stirred at RT for 40 min and then heated at 40° C. for 2 h (80% conversion). The mixture was cooled down at RT. The reaction was quenched with NH$_4$Cl sat. (50 mL), extracted with Et2O (2×25 mL), washed with water (1×25 mL) and brine (1×25 mL), dried over MgSO$_4$. The suspension was filtered and concentrated under vacuum.

The crude product was purified by flash distillation to give 1 g (80%) of (E)-2-(hex-2-en-1-yl)-2,5,5-trimethylcyclopentan-1-one with a purity of 98%.

$^{1}$H NMR (600 MHz, CDCl$_3$): 9.82 (s, 1H), 7.34-7.32 (m, 2H), 7.18-7.16 (m, 2H), 3.05 (s, 3H), 2.95 (t, J=7.5 Hz, 2H), 2.78 (dt, J=7.8 Hz, 1.3 Hz, 2H), 1.51 (s, 6H).

$^{13}$C NMR (125 MHz, CDCl$_3$): 27.7 (t), 27.9 (q), 45.2 (t), 50.6 (q), 76.6 (s), 126.1 (d), 128.1 (d), 138.8 (s), 143.9 (d), 201.6 (d).

Example 2

Preparation of a Perfuming Composition

A perfuming composition for shampoo was prepared by admixing the following ingredients:

| Ingredient name | Parts by weight |
| --- | --- |
| Benzyl acetate | 400 |
| (+−)-1-phenylethyl acetate | 200 |
| Ethyl 3-oxobutanoate | 40 |
| Benzaldehyde | 40 |
| (2E)-2-benzylideneoctanal | 1200 |
| 1,1-dimethyl-2-phenylethyl butanoate | 200 |
| Hexyl butanoate | 80 |
| Allyl hexanoate | 40 |
| 3-methyl-2-[(2Z)-2-penten-1-yl]-2-cyclopenten-1-one | 20 |
| (3Z)-3-hexen-1-ol | 40 |
| 3-hydroxy-2-methyl-4h-pyran-4-one | 40 |
| (+−)-(2E)-1-(2,6,6-trimethyl-2-cyclohexen-1-yl)-2-buten-1-one | 20 |
| (+−)-4-decanolide | 400 |
| (+−)-2,6-dimethyl-7-octen-2-ol | 200 |
| Gamma nonalactone | 100 |
| 3,7-dimethyl-2,6-octadien-1-ol | 200 |
| 1-oxa-12/13-cyclohexadecen-2-one | 1000 |
| Methyl 2-((1RS,2RS)-3-oxo-2-pentylcyclopentyl)acetate | 1400 |
| (+)-2-{(1S)-1-[(1R)-3,3-dimethylcyclohexyl]ethoxy}-2-methylpropyl propionate | 1000 |
| 2-phenoxyethyl 2-methylpropanoate | 400 |
| (+−)-3,7-dimethyl-1,6-octadien-3-ol | 600 |
| (+−)-2-(tetrahydro-5-methyl-5-vinyl-2-furyl)-2-propanol | 40 |
| (2E,6Z)-2,6-nonadienal | 60 |
| 2-phenylethanol | 200 |
| Mixture of 2-methylbutyl salicylate and pentyl salicylate | 400 |
| Benzyl salicylate | 1000 |
| 10% * (1R,4R)-8-mercapto-3-p-menthanone | 40 |
| (+−)-(3E)-4-(2,6,6-trimethyl-1/2-cyclohexen-1-yl)-3-buten-2-one | 100 |
| (3E)-4-(2,6,6-trimethyl-1-cyclohexen-1-yl)-3-buten-2-one | 100 |
| 2,4-dimethyl-3-cyclohexene-1-carbaldehyde | 40 |
| | 9600 |

* in dipropyleneglycol

To the above-described perfuming composition was added 400 parts by weight of the invention's compounds described in Example 1 such as 2-(but-3-en-1-yl)-2,5,5-trimethylcyclopentan-1-one or 2,2,5-trimethyl-5-[(1E)-1-penten-1-yl]cyclopentanone.

The invention claimed is:

1. A method to confer, enhance, improve or modify the odor properties of a perfuming composition or of a perfumed article, which method comprises adding to said composition or article an effective amount of at least a compound of formula

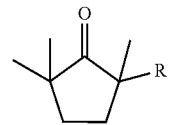
(I)

in the form of any one of its stereoisomers or as a mixture thereof, wherein R represents a C$_{2-8}$ alkenyl or C$_{4-8}$ alkadienyl group.

2. The method according to claim 1, wherein R represents a C$_{2-6}$ alkenyl group.

3. The method according to claim 1, wherein R represents a linear C$_{2-6}$ alkenyl group.

4. The method according to claim 1, wherein the compound is of formula

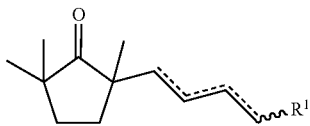

(II)

in the form of any one of its stereoisomers or as a mixture thereof, wherein one dotted line represents a carbon-carbon double bond and the other dotted lines represent a carbon-carbon single bond; $R^1$ represents a hydrogen atom or a $C^{1-2}$ alkyl group.

5. The method according to claim 4, wherein $R^1$ represents a hydrogen atom or a methyl group.

6. The method according to claim 1, wherein the compound of formula (I) is selected from the group consisting of 2-(but-3-en-1-yl)-2,5,5-trimethylcyclopentan-1-one, 2,2,5-trimethyl-5- [(1E)-1-penten-1-yl] cyclopentanone, 2- [(1-buten-1-yl]-2,5,5- trimethylcyclopentanone, 2-[1-hexen-1-yl]-2,5,5-trimethylcyclopentanone, 2-allyl-2,5,5-trimethylcyclopentanone, 2-(5-hexen-1-yl)-2,5,5-trimethylcyclopentanone, 2-[3-hexen-1-yl]- 2,5,5-trimethylcyclopentanone, 2-[4-hexen-1-yl]-2,5,5-trimethylcyclopentanone, 2-(hex-2-enyl)- 2,5,5-trimethylcyclopentanone, and 2,2,5-trimethyl-5-(pent-2-enyl) cyclopentanone.

7. The method according to claim 1, wherein the compound of formula (I) is selected from the group consisting of 2-(but-3-en-1-yl)-2,5,5-trimethylcyclopentan-1-one, 2,2,5-trimethyl-5- [(1E)-1-penten-1-yl] cyclopentanone, and 2,2,5-trimethyl-5-(pent-2- enyl) cyclopentanone.

8. A compound of formula (I):

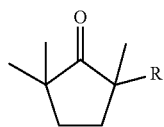

(I)

in the form of any one of its stereoisomers or as a mixture thereof, wherein R represents a $C_{2-8}$ alkenyl or $C_{4-8}$ alkadienyl group.

9. A perfuming composition comprising
i) at least one compound of formula (I), as defined in claim 8;
ii) at least one ingredient selected from the group consisting of a perfumery carrier and a perfumery base; and
iii) optionally at least one perfumery adjuvant.

10. A perfumed consumer product comprising at least one compound of formula (I), as defined in claim 9.

11. The perfumed consumer product according to claim 10, characterized in that the perfumery consumer product is a perfume, a fabric care product, a body-care product, a cosmetic preparation, a skin-care product, an air care product or a home care product.

12. The perfumed consumer product according to claim 11, characterized in that the perfumery consumer product is a fine perfume, a splash or eau de parfum, a cologne, a shave or after-shave lotion, a liquid or solid detergent, a fabric softener, a fabric refresher, an ironing water, a paper, a bleach, a carpet cleaners, curtain-care products a shampoo, a coloring preparation, a color care product, a hair shaping product, a dental care product, a disinfectant, an intimate care product, a hair spray, a vanishing cream, a deodorant or antiperspirant, hair remover, tanning or sun product, a nail product, a skin cleansing, a makeup, a perfumed soap, a shower or bath mousse, oil or gel, or a foot/hand care products, a hygiene product, an air freshener, a "ready to use" powdered air freshener, a mold remover, furnisher care, wipe, a dish detergent or hard-surface detergent, a leather care product, or a car care product.

13. A perfumed consumer product comprising at least one compound of formula (I), as defined in claim 9.

14. The perfumed consumer product according to claim 13, characterized in that the perfumery consumer product is a perfume, a fabric care product, a body-care product, a cosmetic preparation, a skin-care product, an air care product or a home care product.

15. The perfumed consumer product according to claim 14, characterized in that the perfumery consumer product is a fine perfume, a splash or eau de parfum, a cologne, a shave or after-shave lotion, a liquid or solid detergent, a fabric softener, a fabric refresher, an ironing water, a paper, a bleach, a carpet cleaners, curtain-care products a shampoo, a coloring preparation, a color care product, a hair shaping product, a dental care product, a disinfectant, an intimate care product, a hair spray, a vanishing cream, a deodorant or antiperspirant, hair remover, tanning or sun product, a nail product, a skin cleansing, a makeup, a perfumed soap, a shower or bath mousse, oil or gel, or a foot/hand care products, a hygiene product, an air freshener, a "ready to use" powdered air freshener, a mold remover, furnisher care, wipe, a dish detergent or hard-surface detergent, a leather care product, or a car care product.

\* \* \* \* \*